United States Patent [19]

Bethea et al.

[11] Patent Number: 4,965,304
[45] Date of Patent: Oct. 23, 1990

[54] EXTRUDABLE POLYMERIC COMPOSITIONS

[75] Inventors: James R. Bethea, Denham Springs, La.; Stephen R. Betso, Midland, Mich.

[73] Assignee: The Dow Chemical Company, Midland, Mich.

[21] Appl. No.: 215,177

[22] Filed: Jul. 5, 1988

[51] Int. Cl.$^5$ .............................................. C08K 5/53
[52] U.S. Cl. ................................... 524/123; 524/414; 524/417; 524/433; 524/487
[58] Field of Search ............... 524/487, 123, 433, 417, 524/414

[56] References Cited

U.S. PATENT DOCUMENTS

| | | |
|---|---|---|
| 3,388,196 | 6/1968 | Farrell . |
| 3,640,828 | 2/1972 | Bretz et al. . |
| 3,678,619 | 7/1972 | Carlson . |
| 3,862,066 | 1/1975 | Reiter et al. ........................ 524/728 |
| 3,891,598 | 6/1975 | Marzolf ............................... 523/204 |
| 4,132,691 | 1/1979 | Ejk . |
| 4,203,880 | 5/1980 | Stoloff et al. . |
| 4,218,353 | 8/1980 | Kim . |
| 4,246,150 | 1/1981 | Bower . |
| 4,613,533 | 9/1986 | Loomis et al. . |
| 4,627,993 | 12/1986 | Loomis . |

OTHER PUBLICATIONS

"Influence of Formulation on PVC Pipe Extrusion and Reology," J. Zechinati et al. *Soc. Plast. Eng. Tech. Pap.*, 1978, 24, pp. 740–746.

"Characterization of Lubricants for Polyvinyl Chloride," L. F. King et al., *Polymer Engineering and Science*, Mar. 1972, vol. 12, No. 2, pp. 112–119.

"Waxes as Lubricants in Plastics Processing," G. Illmann, *SPE Journal*, Jun. 1967, pp. 71–77.

"IXAN PV 875-Experimental Grade", Solvay Trade Literature, Feb. 1986 Carlisle Chemical Works, Inc., New Brunswick, N.J.

"Three-Component Lubricant Systems for Rigid PVC Pipe Formulations," C. Holt, Plastics Design & Processing, Jul. 1978, pp. 21–25.

"Lubricants and Rheological Properties of Polyvinyl Chloride," Christian H. Stapfer et al.

*Primary Examiner*—Allan Lieberman
*Attorney, Agent, or Firm*—Thomas D. Zindrick

[57] ABSTRACT

The present invention concerns a polymeric composition formed from a vinylidene chloride interpolymer; an olefinic wax and oil and, in one embodiment, a salt of an acid; and in another embodiment, a polyolefin containing up to a minor amount of oxygen, said polyolefin being capable of lowering the frictional coefficient and the mechanical energy to extrude of the polymeric composition.

17 Claims, No Drawings

EXTRUDABLE POLYMERIC COMPOSITIONS

FIELD OF THE INVENTION

The present invention relates to a polymeric composition possessing improved processing properties.

BACKGROUND OF THE INVENTION

Vinylidene chloride interpolymers are well known in the prior art. Such polymers are also well known to be thermally sensitive, which means that upon exposure to desirable processing temperatures such polymers tend to thermally decompose, e.g., generate carbonaceous material contamination, discolor, or evolve hydrogen chloride.

In the past, the practice has been to extrude polymeric compositions comprising a vinylidene chloride interpolymer directly from the form in which it is recovered. Because of the convenience of shipping and handling, it is desirable to form such polymeric compositions into pellets prior to final extrusion. As the demand for pellets has increased, the demand has increased for a pellet which can withstand the myriad processing conditions to which powdered resins are subjected.

While pellets of polymeric compositions comprising vinylidene chloride interpolymers may be an advantageous form from which to fabricate articles, the pellets of such polymeric compositions are particularly difficult to extrude. Pellet formation requires an exposure of the polymeric composition to heat prior to the conventional extrusion step of the polymeric composition into articles. This additional heat history is believed to make the vinylidene chloride interpolymer in pellet form even more susceptible to thermal instability than a vinylidene chloride interpolymer in powder form. Consequently, additive packages which improve the thermal stability of polymeric compositions comprising vinylidene chloride interpolymer in powder form do not necessarily improve the thermal stability of such polymeric compositions in pellet form.

Although satisfactorily extrudable for a relatively short period, it has been found that attempts to extrude vinylidene chloride interpolymer pellets over long periods on certain extrusion equipment have also proven unsatisfactory due to the thermal sensitivity of the vinylidene chloride interpolymer and, consequently, an undesirable level of carbonaceous material contamination, increased discoloration, or higher hydrogen chloride in the extrudate.

It is desirable to produce a polymeric composition which possesses less carbonaceous material contamination, less discoloration, or less hydrogen chloride than vinylidene chloride interpolymer alone; and which can be extruded, in either powder or pellet form, into an extrudate which possesses less carbonaceous material contamination, less discoloration, or less hydrogen chloride than an extrudate formed from vinylidene chloride interpolymer alone. It is to this goal that the present invention is directed.

SUMMARY OF THE INVENTION

The present invention concerns a polymeric composition which comprises (1) a vinylidene chloride interpolymer formed from a monomer mixture comprising vinylidene chloride in an amount of from about 60 to about 99 percent and at least one monoethylenically unsaturated monomer copolymerizable therewith in an amount of from about 40 to about 1 percent, said weight percents being based on total weight of the monomer mixture; (2) an olefinic wax or oil in an amount of from about 0.05 to about 10 weight percent based on the total weight of the polymeric composition; and (3) at least one additive selected from the group consisting of from about 0.01 to 5 weight percent of a salt of an acid and from about 0.01 to about 10 weight percent of a polyolefin being selected to lower the frictional coefficient and the mechanical energy to extrude of the polymeric composition, said weight percents being based on the total weight of the polymeric composition.

DETAILED DESCRIPTION OF THE INVENTION

The present invention is a polymeric composition comprising a vinylidene chloride interpolymer blended with an extrusion formulation package to form a polymeric or plastic composition having improved extrudability. By "polymeric or plastic" composition is meant the interpolymer and the extrusion formulation package as well as other additives.

For the purposes of this invention, improved extrudability means that, if subjected to desirable elevated processing temperatures, the polymeric composition is less thermally sensitive and consequently, the extrudate possesses a reduced level of carbonaceous material contamination, reduced discoloration, or less hydrogen chloride evolvement.

By "extrudate" is meant any composition which becomes partially or totally melted when subjected to elevated temperatures during processing methods, e.g., casting, blowing, extrusion, molding, injection molding, blow molding, coextrusion, laminating, or calendering.

The term "vinylidene chloride interpolymer" encompasses homopolymers, copolymers, terpolymers, etc. of vinylidene chloride. Vinylidene chloride interpolymers suitable for use in the present invention are those vinylidene chloride interpolymers formed from vinylidene chloride and an amount of one or more monoethylenically unsaturated monomers copolymerizable with vinylidene chloride.

In preparing the monomer phase, such phase comprises a mixture containing essentially all of the monomer to be polymerized. The vinylidene chloride monomer will generally be added in an amount of from about 60 weight percent to about 99 weight percent, and the monoethylenically unsaturated monomer or monomers copolymerizable with the vinylidene chloride monomer will generally be added in an amount of from about 40 weight percent to about 1 weight percent, said weight percents being based on the total weight of the monomer mixture. The preferred ranges, as is known to the skilled artisan, are dependent upon the monoethylenically unsaturated monomer copolymerized therewith.

The amount of monoethylenically unsaturated monomer is maintained below an amount effective to destroy the semicrystalline character of the interpolymer By "semicrystalline character" it is meant that the interpolymer has between about 5 percent and about 95 percent crystallinity. Crystallinity values depend upon the measuring technique, and as used herein crystallinity is defined by the commonly used density method. See, for example, the discussion by R. A. Wessling, in Chapter 6 of *Polyvinylidene Chloride, Vol. 5*, Gordon and Breach Science Publishers, New York, 1977, the teachings of which are incorporated herein by reference.

Suitable monoethylenically unsaturated monomers copolymerizable with the vinylidene chloride monomer include vinyl chloride, alkyl acrylates, alkyl methacrylates, acrylic acid, methacrylic acid, itaconic acid, acrylonitrile and methacrylonitrile. The alkyl acrylates and alkyl methacrylates are generally selected to have from about 1 to about 8 carbon atoms per alkyl group. Preferably, alkyl acrylates and alkyl methacrylates are selected to have from about 1 to about 4 carbon atoms per alkyl group. The alkyl acrylates and alkyl methacrylates are most preferably selected from the group consisting of methyl acrylate, ethyl acrylate, and methylmethacrylate.

When the monoethylenically unsaturated monomer employed is vinyl chloride, preferably the vinyl chloride will be added in an amount of from about 30 weight percent to about 5 weight percent and the vinylidene chloride will be added in an amount from about 70 weight percent to about 95 weight percent, said weight percents being based on the total weight of the monomer mixture. Most preferably the vinyl chloride will be added in an amount of from about 25 weight percent to about 10 weight percent and the vinylidene chloride will be added in an amount of from about 75 weight percent to about 90 weight percent, said weight percents being based on the total weight of the monomer mixture.

When the monoethylenically unsaturated monomer employed is an alkyl acrylate, preferably the alkyl acrylate will be added in an amount of from about 15 weight percent to about 2 weight percent and the vinylidene chloride will be added in an amount of from about 85 weight percent to about 98 weight percent, said weight percents being based on the total weight of the monomer mixture. Most preferably the alkyl acrylate will be added in an amount of from about 10 weight percent to about 3 weight percent and the vinylidene chloride will be added in an amount of from about 90 to about 97 percent, said weight percents being based on the total weight of the monomer mixture.

Methods of forming the vinylidene chloride interpolymers are well known in the prior art. The vinylidene chloride interpolymer is generally formed through an emulsion or suspension polymerization process. Exemplary of such processes are U.S. Pat. Nos. 2,558,728; 3,007,903; 3,642,743; and 3,879,359; and the methods described by R. A. Wessling in *Polyvinylidene Chloride*, Gordon and Breach Science Publishers, New York, 1977, Chapter 3, all of which are incorporated herein by reference.

Typically, the monomeric materials are emulsified or suspended in an aqueous phase. The aqueous phase contains a polymerization initiator and a surface active agent capable of emulsifying or suspending the monomeric materials in the aqueous phase. The polymerization of the monomeric materials is usually carried out with heating and agitation.

After polymerization is complete, the resulting suspension or emulsion slurry of vinylidene chloride interpolymer has a majority of an aqueous phase. The resultant slurry is vacuum stripped. Thereafter, the slurry is cooled down, unloaded and dewatered, and the vinylidene chloride interpolymer is collected and further dried.

By "olefinic wax or oil" is meant hydrocarbons, or mixtures of hydrocarbons, having the general formula $C_nH_{2n+2}$. Exemplary olefinic waxes or oils include paraffin waxes, nonoxidized polyethylene waxes, and liquid and solid hydrocarbons such as paraffin oil. Paraffin and polyethylene waxes are preferred.

The olefinic wax or oil is beneficially selected to have a molecular weight of from about 500 to about 9000, preferably from about 1500 to about 6000, and most preferably from about 1500 to about 3000.

Paraffin waxes are defined herein as having a viscosity in the range of about 50 to about 300 cps @ 140° C. Brookfield viscosity; a melting point in the range of from about 40° C. to about 80° C.; and a density in the range of from about 0.85 to about 0.95. Exemplary paraffin waxes include waxes commercially available from Hoechst AG, such as Hoechst XL-165FR, Hoechst XL-165SB, Hoechst XL-165 and the like.

Polyethylene waxes are defined herein as having viscosity in the range of about 130 to about 450 cps @ 140° C. Brookfield viscosity, a melting point in the range of from about 80° C. to about 100° C. and a density in the range of from about 0.85 to about 0.95. Exemplary polyethylene waxes include waxes commercially available from Allied Chemical Co. such as Allied 617A, Allied 6A, Allied 1702 and the like.

Techniques for preparing the olefinic wax or oil are well known in the art. The *Kirk-Othmer Encyclopedia of Chemical Technology,*, Vol. 24, 3rd edition, (1980), the teachings of which are hereby incorporated by reference, sets forth general preparation methods for the olefinic wax or oil.

The olefinic wax or oil is suitably blended with the vinylidene chloride interpolymer in an amount of from about 0.1 weight percent to about 2 weight percent, preferably from about 0.3 weight percent to about 1.5 weight percent, and most preferably from about 0.5 weight percent to about 0.9 weight percent, said weight percents being based upon the total weight of the polymeric composition.

By "salt of an acid" is meant to include salts of inorganic and organic acids. Salts of inorganic acids include those conventionally defined, in an aqueous medium, as soluble inorganic salts of acids (e.g., tetrasodium pyrophosphate); partially soluble inorganic salts of acids (e.g., magnesium oxide, and magnesium hydroxide); and relatively insoluble inorganic salts of acids (e.g., calcium hydroxyphosphate (commonly referred to as tricalcium phosphate). Persons skilled in the art will recognize that the actual solubility of the salt of an acid depends upon a number of variables including the ratio of salt to water, the amount of monomer employed, pH, etc.

Exemplary salts of organic acids include methyl trisodium pyrophosphate, diisoamylamine dipotassium pyrophosphate and the like. Suitable results may also be obtained with organometallic polyphosphates which include the tripolyphosphates (e.g., t-butyl tetrapotassium tripolyphosphate, and the like); and tetrapolyphosphates, (e.g. triethyl tripotassium tetrapolyphosphate and the like). The most preferred salt of an acid is magnesium hydroxide, such as Kisuma 5B which is commercially available from the Kyowa Chemical Co.

The salt of an acid is prepared by processes well known in the art. By way of illustration only, techniques for preparing magnesium hydroxide, tetrasodium pyrophosphate, and tricalcium phosphate are set forth in *The Merck Index*, 10th edition, (1983), which is hereby incorporated by reference.

The salt of an acid suitably have an average particle diameter which is less than or equal to the average particle diameter of the vinylidene chloride interpolymer being stabilized. Persons skilled in the art will recognize that the effectiveness of the salt an acid is generally related to the surface area of the salt employed. For purposes of this invention, the salt of an acid beneficially has a weight average particle diameter of from about 1 to about 50 microns. One skilled in the art, without undue experimentation, will be able to determine the optimum particle size for specific components.

The polymeric composition will contain the salt of an acid in an amount effective to provide an improved color stability of the polymeric composition. Generally the salt of an acid will be present in an amount of from about 0.01 weight percent to about 5 weight percent, preferably from about 0.1 weight percent to about 3 weight percent; and most preferably from about 0.4 weight percent to about 2 weight percent, said total weight percents based upon the weight of the polymeric composition.

By "polyolefin" is meant olefin homopolymers and olefin interpolymers having a melting point in the range of from about 70° C. to about 175° C., and a density in the range of from about 0.85 to about 1.1. The polyolefin should be selected to lower the frictional coefficient and the mechanical energy to extrude of the polymeric composition.

Preferably, the frictional coefficient of the polymeric composition should be at least about 20 percent lower than the frictional coefficient of the polymeric composition without the polyolefin. One method of measuring friction is by impinging a sample of a known cross-section on a rotating roll. The ratio of the tangent force to the radial impinging force is defined as the coefficient of friction (COF). An apparatus called a "screw simulator" is used to allow the measurement of COF at conditions normally found in an extruder feed section. The apparatus and process is described in detail in the following article, which is hereby incorporated by reference: C. I. Chung et al., *Polym. Eng. Sci.*, 17(1), 9 (1977).

Metal temperature at melt, in ° C., defines the lowest temperature of the metal roll where melting is observed. The combination of metal roll thermal properties plus the frictional energy generated causes the material being tested to melt. This has been termed "mechanical melting" in the Chung et al. reference.

Most preferably, the polyolefins are those selected to have a viscosity in the range of from about 200 percent to about 5 percent of the vinylidene chloride interpolymer.

Exemplary polyolefins include but are not limited to low density polyethylene, medium density polyethylene, high density polyethylene, and polypropylene. High density polyethylene is particularly preferred. Generally, the polyolefin may contain a minor amount of oxygen. These oxygen-containing polyolefins are formed by copolymerization of ethylene with some other comonomer, which may contain oxygen. For the purpose of this invention, a "minor amount" of oxygen means that the polyolefin may contain oxygen below an amount that will significantly change the properties from that of the homopolymer.

Techniques for preparing the polyolefins are well known in the art. The *Kirk-Othmer Encyclopedia of Chemical Technology*, Vol. 16, 3rd edition, (1980), the teachings of which are hereby incorporated by reference, sets forth general preparation methods.

The polymeric composition will contain the polyolefin in an amount of from about 0.01 weight percent to about 40 weight percent; preferably, from about 0.3 weight percent to about 15 weight percent; more preferably, in an amount of from about 0.4 to about 5 weight percent; and most preferably, in an amount of from about 0.5 weight percent to about 2 weight percent, said weight percents being based on the total weight of the polymeric composition.

The polymeric compositions of the present invention may have a variety of additives incorporated therein. Additive type and amount will depend upon several factors. One factor is the intended use of the blends. A second factor is tolerance of the blends for the additives. That is, how much additive can be added before physical properties of the blends are adversely affected to an unacceptable level. Other factors are apparent to those skilled in the art of polymer formulation and compounding.

Exemplary additives include plasticizers, heat stabilizers, light stabilizers, pigments, processing aids, lubricants and the like. Each of these additives is known and several types of each are commercially available.

A preferred extrusion formulation package has been found to provide uniquely beneficial results. The combination is taught in copending application Ser. No. 164,741 filed on the Mar. 8, 1988, the teachings of which are hereby incorporated by reference. Generally, that application teaches a polymeric composition which comprises (a) from about 59 8 to about 99.7 weight percent of a vinylidene chloride interpolymer and (b) from about 40.2 to about 0.3 weight percent of an extrusion formulation package, said weight percents being based upon the total weight of the polymeric composition.

Blending of the additives in forming the polymeric composition can be accomplished by using conventional melt processing, as well as dry blending techniques. The additives may be blended concurrently with the vinylidene chloride interpolymer, or may be consecutively blended with the vinylidene chloride interpolymer.

In using conventional processing equipment for thermally sensitive polymers, three conditions should be met. Two conditions which are interrelated, are processing time and processing temperature. In melt processing polymers, it is generally recognized that as processing temperatures increase, processing times must decrease in order to avoid undesirable results such as polymer decomposition. Melt processing must be accomplished at a temperature below that at which decomposition of the vinylidene chloride interpolymer becomes significant. A third condition is that sufficient mixing must be generated during melt processing to provide a visually homogeneous blend, i.e., no visible solids, with a reasonable mixing time.

Exemplary melt processing equipment includes heated two roll compounding mills, Brabender mixers, Banbury mixers, single screw extruders, twin screw extruders, and the like, which are constructed for use with thermally sensitive polymers. See, for example, the discussion by R. Wessling, in Chapter 11 of *Polyvinylidene Chloride*, Vol 5, Gordon and Breach Science Publishers, New York, 1977, the teachings of which are incorporated herein by reference. Desirable results are obtained when an extruder, either a single screw or a twin screw, is used for melt processing the components of the polymeric composition.

When dry blending, the components should be mixed to form a visually uniform admixture. Suitable dry blending equipment includes Hobart mixers, Welex mixers, Henschel High intensity mixers, and the like.

Methods of forming the polymeric composition into pellets are well-known to those skilled in the art. Any method capable of forming the polymeric composition into pellets is suitable for use in the present invention. For the purposes of this application, the terms "pellet" or "pellets" refer to particles having a minimum cross-sectional dimension of at least 1/32 inch, preferably of at least 1/16 inch, and most preferably of at least ⅛ inch; said pellets suitably have a maximum cross-sectional dimension of at least ½ inch, preferably of at least ⅜ inch, and most preferably of at least ¼ inch. An exemplary method of forming the polymeric composition into pellets includes extruding the polymeric composition through a strand die to form an extruded strand, and then chopping the extruded strand into pellets.

The polymeric composition, in either powder or pellet form, may be fabricated into any suitable final product, e.g., a variety of films or other articles. As is well known in the art, films and articles are fabricated with conventional coextrusion, e.g., feedblock coextrusion, multimanifold die coextrusion, or combinations of the two; injection molding coinjection molding; extrusion molding; and lamination techniques. Articles formed therefrom include blown and cast, mono and multi-layer, films; rigid and foam sheet; tubes; pipes; rods; fibers; and various profiles. Lamination techniques are particularly suited to produce multi-ply sheets. As is known in the art, specific laminating techniques include fusion, i.e., whereby self-sustaining lamina are bonded together by applications of heat and pressure; wet combining, i.e., whereby two or more plies are laminated using a tie coat adhesive, which is applied wet, the liquid driven off, and combining by subsequent pressure laminating in one continuous process; or by heat reactivation, i.e., combining a precoated film with another film by heating and reactivating the precoat adhesive so that it becomes receptive to bonding after subsequent pressure laminating.

Exemplary articles include rigid containers used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals. Consequently, multilayer sheet structures employed in packaging materials have organic polymer skin layers laminated on each side of a vinylidene chloride interpolymer barrier layer, generally with glue layers used to promote adhesion between the barrier layer and dissimilar material layers.

The present invention is illustrated in further detail by the following examples. The examples are for the purposes of illustration only, and are not to be construed as limiting the scope of the present invention. All parts and percentages are by weight unless otherwise specifically noted.

EXAMPLES

Polymeric compositions according to the present invention are prepared in the following manner.

Each of the polymeric components used in the examples and comparative examples is coded and described hereinafter at Table I.

TABLE I

| Code | Polymer Components |
| --- | --- |
| PVdC | A resin containing 99% of a vinylidene chloride copolymer, and 1% epoxidized soybean. The vinylidene chloride copolymer is formed via a suspension polymerization process. The vinylidene chloride interpolymer is formed from a monomer mixture comprising about 80 weight percent vinylidene chloride and about 20 weight percent vinyl chloride, based on total monomer mixture weight. The copolymer has a major melting point of 162° C. and a weight average molecular weight of 80,000. |
| OWO*-1 | A paraffin wax having a drop point of 75° C. The wax is commercially available from Hoeschst AG, under the trade designation XL165. |
| OWO-2 | A nonpolar polyethylene wax having a drop point of between 72–77° C. The wax is commercially available from Hoeschst AG, under the trade designation XL165FR. |
| OWO-3 | A paraffin wax having a drop point of between 75–81° C. The wax is commercially available from Hoeschst AG, under the trade designation XL165SB. |
| OWO-4 | A nonpolar polyethylene wax having a drop point of 135° C. and a weight average molecular weight of 9,000. The wax is commercially available from Hoeschst AG, under the trade designation PED 190. |
| OWO-5 | A nonpolar polyethylene wax having a drop point of between 117–122° C. and a weight average molecular weight of 6,000. The wax is commercially available from Hoeschst AG, under the trade designation PED 520. |
| OWO-6 | A nonpolar polyethylene wax having a drop point of between 122–127° C. and a weight average molecular weight of 3,000. The wax is commercially available from Hoeschst AG, under the trade designation PED 130. |
| OWO-7 | A polyethylene homopolymer wax having a weight average molecular weight of 2,400. The wax is commercially available from Allied Chemical Corp., under the trade designation 6-A. |
| OWO-8 | A polyethylene homopolymer wax having a weight average molecular weight of 2,100. The wax is commercially available from Allied Chemical Corp., under the trade designation 617A. |
| SA-1 | Tetrasodium pyrophosphate (TSPP) commercially available from Monsanto Chemical Company. |
| SA-2 | Magnesium hydroxide [$Mg(OH)_2$] commercially available from Kyowa Chemical Company, under the trade designation Kisuma 5B. |
| SA-3 | Tricalcium phosphate (TCP) commercially available from Monsanto Chemical Company as polymer grade. |
| PO-1 | A polyolefin which is a high density polyethylene commercially available from The Dow Chemical Company under the trade designation HD 65053N. The high density polyethylene resin has a density (ASTM Test D-1505) of 0.953 grams per cubic centimeter and a melt index (ASTM Test D-1238) of 65 grams per 10 minutes. |
| PO-2 | A polyolefin which is a low density polyethylene commercially available from The Dow Chemical Company under the trade designation LD-959. The low density polyethylene resin has a density (ASTM Test D-1505) of 0.923 grams per cubic centimeter and a melt index (ASTM Test D-1238) of 59 grams per 10 minutes. |

*Olefinic Wax or Oil

Sample Preparation

Polymeric compositions are formed by blending various quantities of the vinylidene chloride interpolymer, olefinic waxes and oils, and salts of acids set forth in Table I.

The polymeric compositions are formed by dry blending the components. The components are loaded in 20 lb. batches into a Hobart mixer and mixed for a period of approximately on hour.

The powdery mixtures are extruded through a 2" extruder having a length to diameter ratio of 10/1. The extruder has the following set temperatures: (a) Zone 1 temperature=165° C.; (b) Zone 2 temperature=175° C.; and (c) a die temperature=175° C. From the extruder, the blends are passed to a strand die and extruded into a water bath. The strand die has an internal diameter of 0.32 centimeter. Pelletizing is accomplished using a Model 304, 15.24 centimeter strand cutter commercialy available from Conair Incorporated. The pellets have an average length of about 0.130 inch and an average diameter of about 0.145 inch. The strand is then chopped into pellets. However, it is known to one skilled in the art that the polymeric composition could be fabricated into a variety of articles.

COLOR TESTING

Pellet Color

The pellets are visually inspected to determine their color. Color is qualitatively rated on a scale of 1 to 10 over a continuous range of discoloration, wherein 1 represents a creamy white color and 10 a rather dark brown. A composite profile is compiled.

Extrudate Tape Color

The pellets are loaded into a ¾" extruder having the following set temperatures: (a) Zone 1 temperature=165° C.; (b) Zone 2 temperature=175° C.; and (c) Zone 3 temperature=175° C.; (d) die temperature=175° C., and extruded, for a period of about 20 minutes, into tapes in a continuous process.

The extrudate tapes are visually inspected to determine their color. Color is qualitatively rated on a scale of 1 to 10 over a continuous range of discoloration, wherein 1 represents a light tan/coffee color and 10 a rather dark brown. A composite profile is compiled.

The results are set forth in Table II

TABLE II

| Ex- ample | Olefinic Waxes and Oils[1] Type[a] | (%)[b] | Salt of an Acid[2] Type[a] | (%)[b] | PVdC[3] (%) | Color[4] Pellet | Ex- trudate Tape |
|---|---|---|---|---|---|---|---|
| 1 | OWO-1 | 0.5 | SA-1 | 0.5 | balance | 4 | 5 |
| 2 | OWO-8 | 0.5 | SA-1 | 0.5 | balance | 3 | 4 |
| 3 | OWO-1 | 0.5 | SA-2 | 0.5 | balance | 2 | 2 |
| 4 | OWO-8 | 0.5 | SA-2 | 0.5 | balance | 1 | 1 |
| 5 | OWO-1 | 0.5 | SA-3 | 0.5 | balance | 3 | 4 |
| 6 | OWO-8 | 0.5 | SA-3 | 0.5 | balance | 2 | 2 |

[1] Olefinic Wax or Oil = (a) type: as set forth in Table I, and (b) %: in weight percent based upon the total weight of the polymeric composition.
[2] Salt of an Acid = (a) type: as set forth in Table I, and (b) %: in weight percent based upon the total weight of the polymeric composition.
[3] PVdC = the vinylidene chloride interpolymer from Table I. The amount of PVdC in weight percent, % makes up the balance of the total weight of the polymeric composition.
[4] Color = according to visual inspection using a scale of 1 to 10.

As can be seen from the above table, the compositions of the present invention possess an excellent extrudability as evidenced by the good color.

EXAMPLES 7–12

Examples 1–6 are repeated, respectively, with the following exceptions: the vinylidene chloride interpolymer is formed from a monomer mixture comprising about 94 weight percent vinylidene chloride and about 6 weight percent methyl acrylate, said weight percents being based on total monomer mixture weight. The copolymer has a weight average molecular weight of 90,000.

The pellets and extrudate tapes exhibited similarly good color.

MELT ADHESION TESTING

Extrudability of the polymeric composition is determined by (1) measuring the melt adhesion of the polymeric composition as it is melt processed and (2) measuring any carbonaceous material generated in the extruded sheet.

Polymeric compositions are formed by blending various quantities of the vinylidene chloride interpolymer, olefinic waxes and oils and salts of acids set forth in Table I.

The polymeric compositions are formed by dry blending the components. The components are loaded in 20 lb. batches into a Hobart mixer and mixed for a period of approximately one hour.

The powdery mixtures are extruded through a 2" extruder having a length to diameter ratio of 10/1. The extruder has the following set temperatures: (a) Zone 1 temperature=165° C., (b) Zone 2 temperature=175° C. and (c) a die temperature=175° C. From the extruder, the blends are passed to a strand die and extruded into a water bath. The strand is then chopped into pellets. However, it is known to one skilled in the art that the polymeric composition could be fabricated into a variety of articles.

The melt adhesion testing comprises using of a two-roll mill consisting of two steam heated rolls approximately 3 inches in diameter and 6 inches in length that rotate in opposite directions. There is an adjustable gap between the two rolls which rotate at different speeds. The rolls moving at different speeds, causing a shearing effect on the material being tested.

The general sample testing procedure for polymeric composition is the following:

(1) Steam pressure is adjusted to achieve the desired roll temperature, generally 340° to 350° F.

(2) A two hundred gram sample is weighed.

(3) The rolls are started and closed to provide a gap of about zero.

(4) Time is monitored as the sample is poured on the rolls.

(5) The gap between the rolls is slowly opened as the material melts and adheres to the rolls.

(6) When the material is fully melted, i.e., no visible solids are present, the time elapsed since the start of step (4) is recorded.

(7) The gap between the rolls is adjusted so that a small roll of material about ½ inch in diameter is between them.

The roll adhesion is the relative adhesion of the main mass of the material to the roll surface and is determined by how easily the material can be scraped from the roll.

The melt is then tested for its melt adhesion. The adhesion rating is characterized by a rating on a scale of 0 to 5.

0 —The main mass will lift from the roll without leaving any material in a sheet.
1 —The polymer will lift from the roll but will leave a spotty thin coating.
2 —The polymer will not lift from the roll in a sheet. It is necessary to scrape the material off the roll, but it is possible to get the roll fairly clean.
3 —The material will not lift from the roll at all. A path will be scraped. A thin soft layer will remain at the boundary between the roll and melt.
4 —The material must be scraped to the end of the roll. A fairly heavy layer will remain on the roll and melt.
5 —It is very hard to scrape through to the roll. There is a hard layer of material at the boundary and melt.

The results are set forth in Table III.

TABLE III

| Example | Olefinic Waxes and Oils[1] Type[a] | (%)[b] | Salt of an Acid[2] Type[a] | (%)[b] | PVdC[3] (%) | Melt Adhesion[4] |
|---|---|---|---|---|---|---|
| 13 | OWO-1 | 1 | SA-2 | 0.65 | balance | 2 |
| 14 | OWO-2 | 1 | SA-2 | 0.65 | balance | 2 |
| 15 | OWO-3 | 1 | SA-2 | 0.65 | balance | 5 |
| 16 | OWO-4 | 1 | SA-2 | 0.65 | balance | 3 |
| 17 | OWO-5 | 1 | SA-2 | 0.65 | balance | 0 |
| 18 | OWO-6 | 1 | SA-2 | 0.65 | balance | 0 |
| 19 | OWO-7 | 1 | SA-2 | 0.65 | balance | 0 |

[1]Olefinic Wax or Oil = (a) type: as set forth in Table I, and (b) %: in weight percent based upon the total weight of the polymeric composition.
[2]Salt of an Acid = (a) type: as set forth in Table I, and (b) %: in weight percent based upon the total weight of the polymeric composition.
[3]PVdC = vinylidene chloride interpolymer from Table I. The amount of PVdC in weight percent, %, makes up the balance of the total weight of the polymeric composition.
[4]Melt Adhesion = using scale of 0–5, described above.

As can be seen from the above table, the compositions of the present invention possess excellent melt adhesion properties.

EXAMPLES 20–26

Examples 13–19 are repeated, respectively, with the following exceptions: the vinylidene chloride interpolymer is formed from a monomer mixture comprising about 94 weight percent vinylidene chloride and about 6 weight percent methyl acrylate, based on total monomer mixture weight. The copolymer has a weight average molecular weight of 90,000.

The polymeric composition exhibited similarly good melt adhesion.

EXAMPLES 27–30

The procedures of Example 1 are repeated with the following exception: polyolefins selected from Table I are substituted, in varying quantities, for the salt of an acid. The resultant polymeric compositions are tested for melt adhesion.

The results are set forth in Table IV.

TABLE IV

| Example | Olefinic Waxes and Oils[1] Type[a] | (%)[b] | Polyolefin[2] Type[a] | (%)[b] | PVdC[3] (%) | Melt Adhesion[4] |
|---|---|---|---|---|---|---|
| 27 | OWO-3 | 1 | PO-1 | 1.5 | balance | 3 |
| 28 | OWO-8 | 1 | PO-1 | 1.5 | balance | 1 |
| 29 | OWO-3 | 1 | PO-2 | 1.5 | balance | 3 |
| 30 | OWO-8 | 1 | PO-2 | 1.5 | balance | 1 |

[1]Olefinic Wax or Oil = (a) type: as set forth in Table I, and (b) %: in weight percent based upon the total weight of the polymeric composition.
[2]Polyolefin = (a) type: as set forth in Table I, and (b) %: in weight percent based upon the total weight of the polymeric composition.
[3]PVdC = the vinylidene chloride interpolymer from Table I. The amount of PVdC in weight percent, %, makes up the balance of the total weight of the polymeric composition.
[4]Melt Adhesion = using scale of 0–5, described above.

As can be seen from the above table, the compositions of the present invention possess an excellent melt adhesion properties.

EXAMPLES 31–34

Examples 27–30 are repeated, respectively, with the following exceptions: the vinylidene chloride interpolymer is formed from a monomer mixture comprising about 94 weight percent vinylidene chloride and about 6 weight percent methyl acrylate, based on total monomer mixture weight. The copolymer has a weight average molecular weight of 90,000.

The polymeric compositions exhibited similarly good melt adhesion properties.

Although the invention has been described in considerable detail, with reference to certain preferred embodiments thereof, it will be understood that variations and modifications can be affected within the spirit and scope of the invention as described above and as defined in the appended claims.

What is claimed is:

1. A polymeric composition comprising:
(A) a vinylidene chloride interpolymer formed from a monomer mixture comprising vinylidene chloride in an amount of from about 60 to about 99 percent, said monomer weight percent being based on the total weight of the monomer mixture; and at least one monoethylenically unsaturated monomer copolymerizable therewith selected from the group consisting of vinyl chloride, alkyl acrylates, alkyl methacrylates, acrylic acid, methacrylic acid, itaconic acid, acrylonitrile and methacrylonitrile, said ethylenically unsaturated comonomer being maintained in an amount below an amount effective to destroy the semicrystalline character of the interpolymer; and
(B) an extrusion formulation package comprising (1) an olefinic wax or oil in an amount of from about 0.1 to about 2 weight percent, based on the total weight of the polymeric composition, said olefinic wax or oil being a hydrocarbon having the general formula $C_nH_{2n+2}$ and a molecular weight of from about 500 to about 9000; and (2) at least one other additive selected from the group consisting of (a) from about 0.01 to about 5 weight percent, based on the total weight of the polymeric composition, of a salt of an acid having a weight average particle diameter of from about 1 to about 50 microns, said salt being selected from the group consisting of inorganic acids and organo phosphates, and (b) from about 0.01 to about 10 weight percent of a polyolefin capable of lowering the frictional coefficient and the mechanical energy to extrude of the polymeric composition, said polyolefin being selected from the group of olefin homopolymers and interpolymers having a melting point of from about b 70°C. to about 175° C. and a density of from about 0.85 to about 1.1g/cc.

2. The polymeric composition of claim 1, wherein the olefinic wax or oil is present in an amount of from about 0.3 to about 1.5 weight percent, based on the total weight of the mixture.

3. The polymeric composition of claim 2, wherein the olefinic wax or oil is present in an amount of from about 0.5 to about 0.9 weight percent, based on the total weight of the mixture.

4. The polymeric composition of claim 1 wherein the olefinic wax or oil is selected from the group consisting of polyethylene waxes and paraffin waxes.

5. The polymeric composition of claim 1, wherein the salt of an acid is present in an amount of from about 0.1 to about 3 weight percent, based on the total weight of the mixture.

6. The polymeric composition of claim 5, wherein the salt of an acid is present in an amount of from about 0.4 to about 2 weight percent, based on the total weight of the mixture.

7. The polymeric composition of claim 1 wherein the salt of an acid is selected from the group consisting of tetrasodium pyrophosphate, sodium orthophosphate, tricalcium phosphate, magnesium phosphate, magnesium hydroxide, magnesium oxide, sodium oxalate, potassium citrate, and organo phosphates.

8. The polymeric composition of claim 1, wherein the polyolefin is present in an amount of from about 0.1 to about 40 weight percent, based on the total weight of the mixture.

9. The polymeric composition of claim 8, wherein the polyolefin is present in an amount of from about 0.5 to about 2 weight percent, based on the total weight of the mixture.

10. The polymeric composition of claim 1 wherein the polyolefin is selected from the group consisting of polyethylenes and polypropylenes.

11. A polymeric composition comprising:
(A) a vinylidene chloride interpolymer in an amount of from about 99.89 to about 94 weight percent, said weight percents being based on the total weight of the polymeric composition, the interpolymer being formed from a monomer mixture comprising vinylidene chloride in an amount of from about 60 to about 99 percent, said monomer weight percent being based on the total weight of the monomer mixture; and at least one monoethylenically unsaturated monomer copolymerizable therewith selected from the group consisting of vinyl chloride, alkyl acrylates, alkyl methacrylates, acrylic acid, methacrylic acid, itaconic acid, acrylonitrile, and methacrylonitrile, said ethylenically unsaturated comonomer being maintained in an amount below an amount effective to destroy the semicrystalline character of the interpolymer; and
(B) an extrusion formulation package comprising (1) from about 0.5 to about 0.9 weight percent, based on the total weight of the polymeric composition, of an olefinic wax or oil selected from the group consisting of polyethylene waxes and paraffin waxes, said olefinic wax or oil being a hydrocarbon having the general formula $C_nH_{2n+2}$ and a molecular weight of from 500 to about 9000; (2) from about 0.4 to about 2 weight percent of at least one salt of an acid having a weight average particle diameter of from about 1 to about 50 microns, said salt being selected from the group consisting of tetrasodium pyrophosphate, sodium orthophosphate, tricalcium phosphate, magnesium phosphate, magnesium hydroxide, magnesium oxide, sodium oxalate, potassium citrate, and organo phosphates; and (3) from about 0.5 to about 2 weight percent, based on the total weight of the polymeric composition, of a polyolefin which lowers the frictional coefficient and the mechanical energy to extrude of the polymeric composition, said polyolefin being selected from the group of olefin homopolymers and interpolymers having a melting point of from about 70° C. to about 175° C. and a density from about 0.85 to about 1.1 g/cc.

12. The polymeric composition of claim 1, wherein the composition is in the form of a pellet.

13. The polymeric composition of claim 11, wherein the composition is in the form of a pellet.

14. A process for making an article, said process comprising the following steps:
(A) providing a polymeric composition which comprises
(1) a vinylidene chloride interpolymer formed from a monomer mixture comprising vinylidene chloride in an amount of from about 60 to about 99 percent, said monomer weight percent being based on the total weight of the monomer mixture; and at least one monoethylenically unsaturated monomer copolymerizable therewith selected from the group consisting of vinyl chloride, alkyl acrylates, alkyl methacrylates, acrylic acid, methacrylic acid, itaconic acid, acrylonitrile and methacrylonitrile, said ethylenically unsaturated comonomer being maintained in an amount below an amount effective to destroy the semicrystalline character of the interpolymer, and
(2) an extrusion formulation package comprising (a) an olefinic wax or oil in an amount of from about 0.1 to about 2 weight percent, based on the total weight of the polymeric composition, said olefinic wax or oil being a hydrocarbon having the general formula $C_nH_{2n+2}$ and a molecular weight of from about 500 to about 9000; and (b) at least one other additive selected from the group consisting of (i) from about 0.01 to 5 weight percent, based on the total weight of the polymeric composition, of a salt of an acid having a weight average particle diameter of from about 1 to about 50 microns, said salt being selected from the group consisting of inorganic acids and organo phosphates, and (ii) from about 0.1 to about 40 weight percent of a polyolefin capable of lowering the frictional coefficient and the mechanical energy to extrude of the polymeric composition, said polyolefin being selected from the group of olefin homopolymers and interpolymers having a melting point of from about 70° C. to about 175° C. and a density from about 0.85 to about 1.1 g/cc; and
(B) fabricating the composition into an article using a method selected from the group consisting of 15. A process for making an article, said process comprising:
(A) providing a polymeric composition which comprises
(1) a vinylidene chloride interpolymer in an amount of from about 99.89 to about 94 weight percent, said weight percents being based on the total weight of the polymeric composition, the interpolymer being formed from a monomer mixture comprising vinylidene chloride in an amount of from about 60 to about 99 percent, said monomer weight percent being based on the total weight of the monomer mixture; and at least one monoethylenically unsaturated monomer copolymerizable therewith selected from the group consisting of vinyl chloride, alkyl acrylates, alkyl methacrylates, acrylic acid, methacrylic acid, itaconic acid, acrylonitrile, and methacrylonitrile, said ethylenically unsaturated comonomer being maintained in an amount below an amount effective to destroy the semicrystalline character of the interpolymer, and (2) an extrusion formulation package comprising (a) from about 0.5 to about 0.9 weight percent, based on the total weight of the polymeric composition, of an olefinic wax or oil selected from the group consisting of polyethylene waxes and paraffin waxes, said olefinic wax or oil being a hydrocarbon having the general formula $C_nH_{2n+2}$ and a molecular weight of from about 500 to about 9000; (b) from about 0.4 to about 2 weight percent, based on the total weight of the polymeric composition, of at least one salt of an acid having a weight average particle diameter of from about 1 to about 50 microns, said salt being selected from the group consisting of tetrasodium pyrophosphate, sodium orthophosphate, tricalcium phosphate, magnesium phosphate, magnesium hydroxide, magnesium oxide, sodium oxalate, potassium citrate, and organo phosphates; and (c) from about 0.5 to about 2 weight percent, based on the total weight of the polymeric composition, of a polyolefin which lowers the frictional coefficient and the mechanical energy to extrude of the polymeric composition, said polyolefin being selected from the group of olefin homopolymers and interpolymers having a melting point of from about 70° C. to about 175° C. and a density from about 0.85 to about 1.1 g/cc; and (B) fabricating the composition into an article using a method selected from the group consisting of casting, blowing, extrusion, molding, injection molding, blow molding, coextrusion, laminating, or calendering.

16. An article formed from a polymeric composition, said polymeric composition comprising:

(A) a vinylidene chloride interpolymer formed from a monomer mixture comprising vinylidene chloride in an amount of from about 60 to about 99 percent, said monomer weight percent being based on the total weight of the monomer mixture; and at least one monoethylenically unsaturated monomer copolymerizable therewith selected from the group consisting of vinyl chloride, alkyl acrylates, alkyl methacrylates, acrylate acid, methacrylic acid, itaconic acid, arylonitrile and methacrylonitrile, said ethylenically unsaturated comonomer being maintained in an amount below an amount effective to destroy the semicrystalline character of the interpolymer; and (B) an extrusion formulation package comprising (1) an olefinic wax or oil in an amount of from about 0.1 to about 2 weight percent, based on the total weight of the polymeric composition, saID olefinic wax or oil being a hydrocarbon having the general formula $C_nH_{2n+2}$ and a molecular weight of from about 500 to about 9000; and (2) at least one other additive selected from the group consisting of (a) from about 0.01 to 5 weight percent of a salt of an acid having a weight average particle diameter of from about 1 to about 50 microns, said salt being selected from the group consisting of inorganic solids and organo phosphates, and (b) from about 0.1 about 40 weight percent, based on the total weight of the polymeric composition, of a polyolefin capable of lowering the frictional coefficient and the mechanical energy to extrude of the polymeric composition, said polyolefin being selected from the group of olefin homopolymers and interpolymers having a melting point of from about 70° to about 175° C. and a density from about 0.85 to about 1.1 g/cc.

17. An article formed from a polymeric composition, said polymeric composition comprising:

(A) a vinylidene chloride interpolymer in an amount of from about 99.89 to about 94 weight percent, said weight percents being based on the total weight of the polymeric composition, the interpolymer being formed from a monomer mixture comprising vinylidene chloride in an amount of from about 60 to about 99 percent, said monomer weight percent being based on the total weight of the monomer mixture; and at least one monoethylenically unsaturated monomer copolymerizable therewith selected from the group consisting of vinyl chloride, alkyl acrylates, alkyl methacrylates, acrylic acid, methacrylic acid, itaconic acid, acrylonitrile, and methacrylonitrile, said ethylenically unsaturated comonomer being maintained in an amount below an amount effective to destroy the semicrystalline character of the interpolymer; and (B) an extrusion formulation package comprising (1) from about 0.5 to about 0.9 weight percent, based on the total weight of the polymeric composition, of an olefinic wax or oil selected from the group consisting of polyethylene waxes and paraffin waxes, said olefinic wax or oil being a hydrocarbon having the general formula $C_nH_{2n+2}$ and a molecular weight of from about 500 to about 9000; (2) from about 0.4 to about 2 weight percent, based on the total weight of the polymeric composition, of at least one salt of an acid having a weight average particle diameter of from about 1 to about 50 microns, said salt being selected from the group consisting of tetrasodium pyrophosphate, sodium orthophosphate, tricalcium phosphate, magnesium phosphate, magnesium hydroxide, magnesium oxide, sodium oxalate, potassium citrate, and group phosphates and (3) from about 0.5 to about 2 weight percent, based on the total weight of the polymeric composition, of a polyolefin which lowers the frictional coefficient and the mechanical energy to extrude of the polymeric composition, said polyolefin being selected from the group of olefin homopolymers and interpolymers having a melting point of from about 70° C. to about 175° C. and a density from about 0.85 to about 1.1 g/cc.

* * * * *